(12) United States Patent
Miyajima et al.

(10) Patent No.: US 7,935,167 B2
(45) Date of Patent: May 3, 2011

(54) COMPOSITE CERAMIC BODY, METHOD OF MANUFACTURING THE SAME AND CERAMIC FILTER ASSEMBLY

(75) Inventors: Keita Miyajima, Nagoya (JP); Yasunori Ando, Nagoya (JP)

(73) Assignee: Noritake Co., Ltd., Nagoya-shi (JP)

( * ) Notice: Subject to any disclaimer, the term of this patent is extended or adjusted under 35 U.S.C. 154(b) by 370 days.

(21) Appl. No.: 12/216,044

(22) Filed: Jun. 27, 2008

(65) Prior Publication Data

US 2009/0007532 A1 Jan. 8, 2009

(30) Foreign Application Priority Data

Jun. 29, 2007 (JP) ................................. 2007-172120

(51) Int. Cl.
*B01D 39/06* (2006.01)
*B01D 39/14* (2006.01)
*B01D 24/00* (2006.01)
*B01D 50/00* (2006.01)
*F01N 3/00* (2006.01)

(52) U.S. Cl. .............. 55/523; 55/522; 55/524; 422/169; 422/170; 422/171; 422/172; 422/177; 422/178; 422/179; 422/180; 422/181; 422/182; 60/297

(58) Field of Classification Search ............ 55/522–524; 60/297; 422/168–172, 177–182
See application file for complete search history.

(56) References Cited

U.S. PATENT DOCUMENTS

| | | | |
|---|---|---|---|
| 4,364,759 A * | 12/1982 | Brooks et al. ................ 55/487 |
| 4,720,532 A * | 1/1988 | Seyferth et al. .............. 528/28 |
| 4,935,481 A * | 6/1990 | Vaahs et al. .................. 528/28 |
| 4,946,920 A * | 8/1990 | Vaahs et al. .................. 528/33 |
| 5,008,422 A * | 4/1991 | Blum et al. .................. 556/412 |
| 5,139,717 A * | 8/1992 | Peuckert et al. ............. 264/624 |
| 5,223,138 A * | 6/1993 | Zievers et al. ........... 210/497.01 |
| 5,459,114 A * | 10/1995 | Kaya et al. .................. 501/95.2 |
| 5,747,623 A * | 5/1998 | Matsuo et al. ................ 528/14 |
| 6,083,860 A * | 7/2000 | Matsuo et al. ................ 501/92 |
| 6,660,068 B1 * | 12/2003 | Garner et al. ................ 95/283 |
| 2004/0009865 A1* | 1/2004 | Nair et al. .................. 501/97.1 |
| 2005/0211626 A1* | 9/2005 | Nair et al. .................. 210/510.1 |
| 2005/0227060 A1* | 10/2005 | Mase et al. ................ 428/304.4 |
| 2006/0120937 A1* | 6/2006 | Zuberi ...................... 423/215.5 |

FOREIGN PATENT DOCUMENTS

JP    A-63-309526    12/1988

(Continued)

OTHER PUBLICATIONS

Dec. 1, 2009 Office Action issued in Japanese Patent Application No. 2007-172120 (with translation).

*Primary Examiner* — Walter D Griffin
*Assistant Examiner* — Amber Orlando
(74) *Attorney, Agent, or Firm* — Oliff & Berridge, PLC

(57) ABSTRACT

A method for manufacturing a composite ceramic body with occluding a plurality of pores that are open at its surface of a porous ceramic body, the method includes the steps of impregnating a polysilazane solution including polysilazane having a repetition structure of fundamental units of at least one of $[-Si(H)(C_nH_{2n+1})-NH-]$ and $[-Si(C_nH_{2n+1})_2-NH-]$, and a predetermined organic solvent, into the plurality of pores of the porous ceramic body, and heating the porous ceramic body to convert the polysilazane in the plurality of pores into ceramic material.

8 Claims, 8 Drawing Sheets

POROUS SILICON NITRIDE

FOREIGN PATENT DOCUMENTS

| | | |
|---|---|---|
| JP | A 2-248378 | 10/1990 |
| JP | A 4-219380 | 8/1992 |
| JP | A-05-319959 | 12/1993 |
| JP | A 9-157051 | 6/1997 |
| JP | A 2004-238243 | 8/2004 |

* cited by examiner

POROUS SILICON NITRIDE

COMPOSITE CERAMIC BODY, METHOD OF MANUFACTURING THE SAME AND CERAMIC FILTER ASSEMBLY

This application is based on Japanese Patent Application No. 2007-172120 filed Jun. 29, 2007, the contents of which are incorporated hereinto by reference.

BACKGROUND OF THE INVENTION

1. Field of the Invention

The present invention relates to a composite ceramic body in which pores of a porous ceramic body that are opened on the surface of the porous ceramic body are occluded by another ceramic material, a method of manufacturing the same and a ceramic filter assembly.

2. Description of Related Art

Porous material is important and utilized in a very wide range of industrial fields such as for separation and adsorption and as a substrate for catalyst. For instance, in chemical engineering many researches and developments to improve reaction efficiencies by utilizing separation, adsorption and catalyst reactions recently and frequently proceeds using porous material in the reaction system, in the reactor for obtaining the desired production by separation and reaction in the flow process after introducing material fluid into the reaction system. Such a reactor is usually used at a high temperature and at a high pressure, and, therefore, superior thermal, chemical and mechanical durability is required for the porous material for the reactor.

Ceramic materials are used for components requiring high thermal, chemical and mechanical durability. Especially, silicon nitride is used in various heavy-loaded environments since it is superior in mechanical, thermal and chemical stability. The application of a silicon nitride porous body for a filter is expected for separation technique in a severe environment such as at a higher temperature than 300° C. and in an acid or alkali mood.

In use for such as a reactor and a separation device, in general, the porous ceramic body is used for a filter assembly connected to a connector made of heat-resistant dense material such as metal and ceramic. Sealing technique for sealing in the connection of the porous ceramic body and the connector is important to prevent leakage of fluids other thin desired ones for separation. Not only superior mechanical, thermal and chemical stability but also superior capability in sealing at a high temperature and at a high pressure are required especially for sealing for the silicon nitride porous body expected in use at a high temperature and at a high pressure.

Various sealing manners have been suggested. For instance, brazing connection by brazing metal, connection by glass and sealing by a metal ring are useful for sealing at a higher temperature than 300° C. and at a high pressure. Some manners for connection of the porous ceramic body and the connector by a bond such as brazing metal and glass have such a disadvantage that low viscosity of the bond due to high temperature when connecting causes occlusion of pores in other area than the desired sealing area by permeation of the bond into the pores due to capillary attraction of the pores of the porous ceramic body. Remarkable difference in thermal expansion coefficient between the porous ceramic body and the bond permeated into the pores has a disadvantage such that stress due to the difference in thermal expansion coefficient causes cracks in the porous ceramic body at a high temperature. Sealing by a metal ring with a porous ceramic body having low mechanical strength such as a thin porous ceramic body has a disadvantage that causes cracks due to loading on the metal ring for sealing.

To prevent the above disadvantages, filling of another material such as ceramic or heat-resistant metal having substantially equal thermal expansion coefficient into the pores of the porous ceramic body at the connection with the connector to be dense has been suggested. For instance, JP 05-319959 A discloses dense ceramic material obtained by impregnation of polysilazane into the pores of the porous ceramic body, crosslinking and hardening of the polysilazane in the pores, and burning treatment for conversion into ceramic material. The polysilazane used to manufacture the dense (or high-density) ceramic material has a structure selected from the following Structures A to D, and has 200-3000 g/mol in its number-average molecular weight and 100 Pa·s or smaller in its viscosity at the temperature of impregnation.

- Structure A: Polysilazane having repetition of substantial units of —[(SiH$_2$)$_n$(NH)$_r$]— (where, n and r have any one of 1, 2 and 3).
- Structure B: Polysiloxazane having repetition of substantial units of —[(SiH$_2$)$_n$(NH)$_r$]— and —[(SiH$_2$)$_m$O]— (where, n, m and r have any one of 1, 2 and 3).
- Structure C: Modified polysilazane having repetition of substantial units of —[(SiH$_2$)$_n$(NH)$_r$]— (where, n and r have any one of 1, 2 and 3), and a crosslinking bonding —(NH)$_s$— (where, s have 1 or 2).
- Structure D: Polymetallosilazane, a reaction product of polysilazane and metal alkoxide.

The high-density ceramic material disclosed in JP 05-319959 A, regretfully, has a large value of about 4% or 2.2% in its porosity even after five repetitions of a set of impregnation and burning. The connection of the above porous ceramic body with the connector may cause leakage at the sealing in use of such as gas separation and nanofilteration (NF) to separate an object having a size in an order of nanometer.

The inventors of the present invention have found that any porous ceramic body of silicon nitride with polysilazane of any one of the above Structures A to D manufactured by the technique according to JP 05-319959 A cracked in the steps of crosslinking and hardening and burning treatment after impregnation. These cracks are presumed to have been generated due to internal stress of polysilazane impregnated into the pores by reduction in its volume in the steps of crosslinking and hardening and burning treatment. Especially, the porous ceramic bodies for such as gas separation and use for a reactor described above tend to crack due to their low mechanical strength derived from their thin body configured and high porosity of 30% or higher prepared for reduction of resistance in permeation of fluid to be separated. The cracks in the porous ceramic body tend to cause not only remarkable lower performance by leakage of the fluid to be separated but also destruction of the body by growth of the cracks at a high temperature or at a high pressure.

It is therefore an object of the present invention to provide a composite ceramic body that is hard to be cracked and preferably densified, a method for manufacturing the same, and a ceramic filter assembly constituted of the porous ceramic body tightly connected to a filter component such as a connector.

SUMMARY OF THE INVENTION

The object indicated above may be achieved according to a first aspect of the invention, which provides a method for manufacturing a composite ceramic body with occluding a plurality of pores that are open at its surface of a porous ceramic body, the method comprising the steps of (a) impregnating a polysilazane solution including polysilazane having a repetition structure of fundamental units of at least one of [—Si(H)($C_nH_{2n+1}$)—NH—] and [—Si($C_nH_{2n+1}$)$_2$—NH—], and a predetermined organic solvent, into the plurality of pores of the porous ceramic body, and (b) heating the porous ceramic body to convert the polysilazane in the plurality of pores into ceramic material.

The object indicated above may be achieved according to a second aspect of the invention, which provides a composite ceramic body comprising (a) a porous ceramic body having a plurality of pores that are open at its surface, and (b) a ceramic filler generated from polysilazane having a repetition structure of fundamental units of at least one of [—Si(H)($C_nH_{2n+1}$)—NH—] and [—Si($C_nH_{2n+1}$)$_2$—NH—], and filled into the plurality of pores to occlude them.

The object indicated above may be achieved according to a third aspect of the invention, which provides a ceramic filter assembly comprising the composite ceramic body of the second aspect of the invention, and a filter component made of dense material tightly connected to a surface in a predetermined area of the composite ceramic body.

According to the first aspect of the invention, in the step of impregnating, a polysilazane solution including polysilazane having a repetition structure of fundamental units of at least one of [—Si(H)($C_nH_{2n+1}$)—NH—] and [—Si($C_nH_{2n+1}$)$_2$—NH—] is impregnated into the plurality of pores of the porous ceramic body, and in the step of heating, the polysilazane in the plurality of pores is converted into ceramic material. Then, crosslinking and polymerization reactions of the polysilazane upon drying and burning are restrained and it causes restraining volume shrinkage, and furthermore, preventing generating cracks. Besides, restraining crosslinking and polymerization reaction permits use of polysilazane of high molecular weight, and it causes restraining, generating voids by volatilization of the solvent in drying and burning, and furthermore, it causes restraining increasing of porosity. Thus, densification by occlusion of pores in the porous ceramic body with the ceramic filler converted from polysilazane can be achieved with restraining generation of cracks. Any kind of the step for impregnating such as with impregnating the polysilazane solution into all the plurality of pores or with impregnating the polysilazane solution into the plurality of pores within a predetermined area may be adopted.

Although the reason for the above effect is not made clear, it is inferred that respective bonding of hydrogen to a silicon atom and a nitrogen atom adjacent to each other is requisite for crosslinking and polymerization reactions of polysilazane (See JP 63-309526 A, especially the left bottom column of page 4). It is inferred that since the part in which $C_nH_{2n+1}$ bonds to Si in the structure cannot be the reaction point, crosslinking and polymerization reactions are restrained in polysilazane used in the first aspect of the invention. That is, polysilazane used in the present invention is another one than that disclosed in JP 05-319959 A in that bonding of $C_nH_{2n+1}$ described above.

Polysilazane is a substance comprising silicon (Si), nitrogen (N), hydrogen (H) and carbon (C). A ceramic precursor having a repetition structure of fundamental units of, especially, [—Si(H)($C_nH_{2n+1}$)—NH—] and/or [—Si($C_nH_{2n+1}$)$_2$—NH—] is used in the step of impregnating in the present invention (See JP 63-309526 A). However, it is not necessary that the whole is the repetition structure of these fundamental units. For instance, a structure including [—SiH$_2$—NH—] that does not include $C_nH_{2n+1}$ may be employed. No limitation in the ratio of [—SiH$_2$—NH—] with respect to the whole is needed since crosslinking and polymerization reactions are restrained in accordance with the ratio of [—Si(H)($C_nH_{2n+1}$)—NH—] or [—Si($C_nH_{2n+1}$)$_2$—NH—] with respect to the whole even if this fundamental unit constitutes a part, and the effect described above is expected in accordance with the ratio.

According to the second aspect of the invention, the plurality of pores of the porous ceramic body of the composite ceramic body are filled with the ceramic filler generated from polysilazane having a repetition structure of fundamental units of at least one of [—Si(H)($C_nH_{2n+1}$)—NH—] and [—Si($C_nH_{2n+1}$)$_2$—NH—] to occlude the pores, and, accordingly, it provides the dense composite ceramic body having substantially no cracks. "A plurality of pores that are open at its surface (of a porous ceramic body)" described above expresses a structure of the porous ceramic body, one of the components of the composite ceramic body, and this "a plurality of pores" may include the pores filled with the ceramic filler.

According to the third aspect, a filter component made of dense material is tightly connected to a surface in a predetermined area of the composite ceramic body, and, accordingly, it provides a ceramic filter assembly having superior sealing at the connection of the porous ceramic body and the dense filter component such as the connector due to sufficient sealing at the connection. Any appropriate filter component made of dense material such as a heat-resistant connector made of metal or ceramic material may be selected in accordance with its use of the ceramic filter assembly. It is preferable for components in which cracks tend to be generated upon connecting that has been difficult to realize without cracks in the conventional manner.

In the preferred embodiment according to the first aspect of the invention, the porous ceramic body is immersed in the polysilazane solution in the step of impregnating, and is heated in a condition that the porous ceramic body is immersed in the polysilazane solution in the step of heating. This provides proceeding in crosslinking hardening and burning of polysilazane with the polysilazane solution filled in the pores, and accordingly, provides further denser filling in the pores with polysilazane.

In the preferred embodiment according to the first aspect of the invention, the polysilazane has about 500-5000 g/mol in its number-average molecular weight. Since polysilazane of small molecular weight tends to volatilize in the step of burning and is difficult to be densely filled in the pores, the polysilazane is preferable to have 500 g/mol or larger in its number-average molecular weight. And since polysilazane having larger molecular weight tends to gel and is difficult to be handled, the polysilazane is preferable to have 5000 g/mol or smaller in its number-average molecular weight. Furthermore, the polysilazane is more preferable to have 1000 g/mol or larger and 4500 g/mol or smaller in its number-average molecular weight.

Preferably, the polysilazane may be such as a methyl group ($CH_3$), an ethyl group ($C_2H_5$), a propyl group ($C_3H_7$) or a butyl group ($C_4H_9$) for $C_nH_{2n+1}$ in the above structure. Especially, one having a methyl group is more preferable.

In the preferred embodiment according to the second aspect of the invention, pores included in the plurality of pores in a predetermined area on the surface of the porous ceramic body, are occluded by the ceramic filler. That is, the composite ceramic body having all the plurality of pores on the surface of the porous ceramic body filled with the ceramic filler may be employed, on the other hand, one having pores within the necessary area in accordance with its use selectively filled with the ceramic filler may be employed.

In the preferred embodiment according to the third aspect of the invention, the plurality of pores of the porous ceramic body are coated with a separation layer having a plurality of micro pores of which a diameter is smaller than that of the plurality of pores of the porous ceramic body. This provides a ceramic filter assembly including a plurality of different components in their roles such as a porous ceramic body, that is, a component for obtaining mechanical strength, and a separation layer, that is, a component for separation functioning, on its surface. The porous ceramic body having sufficient thicknesses for obtaining its mechanical strength, and having pores that are sufficiently large in diameter to reduce permeation resistance of the fluid may be employed. While the ceramic filter assembly according to the third aspect may be one in which the porous ceramic body functions itself as a separation layer, the above assembly is easy to be superior in both mechanical strength and fluid permeation.

More preferably, the porous ceramic body has an intermediate layer having pores of relatively small in diameter disposed on the surface of a support layer having pores of relatively large in diameter, and the separation layer is disposed on the intermediate layer. This provides the thicker support layer and larger pores in diameter with moderating the effects of the thickness of the separation layer and the diameter of the pores to be easier to be superior in both mechanical strength and fluid permeation. Upon manufacturing the ceramic filter including the separation layer having fine pores on the surface of the porous ceramic body, the sizes of the pores on the surface of the porous ceramic body is limited in accordance with the thickness of the separation layer and pores, to form the separation layer without defects. On the other hand, the porous ceramic body is required to have the sufficient thickness to obtain mechanical strength, and accordingly, smaller pores of the porous ceramic body in diameter to form a separation layer having fine pores causes nonnegligibly larger fluid permeation resistance in the porous ceramic body. The above-described embodiment permits larger pores in the support layer of the porous ceramic body in diameter to a degree negligible in fluid permeation resistance, by disposing the intermediate layer having the diameter of the pores in accordance with the diameter of the pores in the separation layer.

In the preferred embodiment according to the third aspect of the invention, the porous ceramic body is made of silicon nitride ceramic, and the separation layer is made of another polysilazane having a repetition structure of fundamental units of at least one of [—Si(H)($C_nH_{2n+1}$)—NH—], [—Si($C_nH_{2n+1}$)$_2$—NH—] and [—SiH$_2$—NH—]. This provides a highly heat- and shock-resistant ceramic filter assembly preferably usable at a high temperature and/or at a high pressure since the porous ceramic body and the separation layer are constituted of ceramic made of at least one of Si—N, Si—C, Si—O—C, Si—O—N and Si—O—C—N, preferably, silicon nitride series ceramic. More preferably, the above another polysilazane has a repetition structure of fundamental units of at least one of [—Si(H)(CH$_3$)—NH—], [—Si(CH$_3$)$_2$—NH—] and [—SiH$_2$—NH—].

The organic solvent constituting the polysilazane solution to be filled in the pores may be the conventional one. Preferably, such as toluene or xylene is employed.

The viscosity of the polysilazane solution to be filled in the pores is determined in accordance with the diameter and porosity so as to sufficiently permeate into the pores in the porous ceramic body. For instance, about 1 mPa·s or larger and 100 mPa·s or smaller in viscosity is preferable when the polysilazane solution is filled into the silicon nitride porous body of about 1 μm in diameter of pores and about 37% in porosity.

The diameter of pores and the porosity of the porous ceramic body according to the present invention are not limited to the specified values, and the porous ceramic body having any predetermined values in diameter of pores and the porosity can be employed. More preferably, the porous ceramic body of 0.002-5.000 μm in diameter of pores and 20%-60% in porosity is employed. The porous ceramic body having values in the ranges of these diameter of pores and porosity can be facilitated to be densified by occlusion of the pores by using the polysilazane solution. Most preferably, the porous ceramic body of 0.05-1.00 μm in diameter of pores and 30%-50% in porosity is employed.

Preferably, in the step of permeation, the porous ceramic body is immersed in the polysilazane solution in a vacuum mood. This provides the porous ceramic body in which the polysilazane solution is further permeated into the pores.

Preferably, the step of heating proceeds in an inert mood. This restrains oxidization of polysilazane and generates ceramic made of at least one of Si—N, Si—C, Si—O—C, Si—O—N and Si—O—C—N. The oxygen atoms included in these Si—O—C, Si—O—N and Si—O—C—N are derived from the very small amount of impurities in the reaction step. The above inert mood is such as the nitrogen or argon mood. That is, the step of heating can be performed in the oxidization or inert mood in accordance with the kind of ceramic to be made from polysilazane. Heating treatment in the inert mood causes preferable generation of non-oxide ceramic from polysilazane. Accordingly, the same series of material of the ceramic filler as the porous ceramic body can be employed for filling the pores with when the porous ceramic body is made of non-oxide ceramic such as silicon nitride.

In the inert mood, non-oxide ceramic such as silicon nitride and silicon carbide is generated from polysilazane. However, these are generated in the burning treatment at about 1100° C., otherwise, for instance, at the lower temperature than it, ceramic composition in amorphous state is generated. This ceramic composition is mainly made of Si—C and/or Si—N, and it may include a bonding unit such as Si—O—Si, Si—O—N, Si—O—C and Si—O—C—N generated by the very small amount of impurities in the reaction step.

Preferably, the temperature in the heating treatment, that is, the temperature in the burning step is set at about 600-1300° C. in the step of heating. This permits sufficient conversion of polysilazane into Si—N—C series ceramic. The burning temperature is preferably set at the higher temperature by about not smaller than 100° C. (that is, by about 100° C. higher or further higher), than the treatment temperature upon forming the separation layer or bonding to the filter component. This preferably restrains decomposition of non-oxide ceramic generated from polysilazane even if heated in the following steps.

The filter components are bonded to the composite ceramic body to constitute the ceramic filter assembly, by brazing metal or sealing glass. Appropriate kind of brazing metal or sealing glass is selected in accordance with the kind of the porous ceramic body and the filter components. Ag—Cu—Ti series alloy brazing material is, for instance, employed for the brazing metal when the filter component is a metal connector made of Kovar® alloy. In this bonding treatment, for instance, brazing material is applied on the surface of the bonded portion of the composite ceramic body or the filter component, and the brazing material is molten at about 900° C. in a vacuum for bonding.

The connecting of the composite ceramic body to the filter component may be achieved by some kinds of metal rings. The composite ceramic body may be connected through a heat-resistant metal ring to the filter component in a densified portion of the composite ceramic body. Any metal ring having a suitable shape such as a C-ring, an O-ring and an E-ring for a shape of the bonded portion and its use may be employed.

The separation layer formed on the surface of the composite ceramic body may be formed before or after bonding (or connecting) of the composite ceramic body to the filter component. It is preferable to form the separation layer after bonding when the heating treatment temperature upon forming the separation layer is lower than the heating temperature upon bonding.

Preferably, the viscosity of the polysilazane solution for generating the separation layer ranges 20-200 mPa·s, more preferably, 25-150 mPa·s. The molecular weight of the polysilazane is, preferably, 2000 g/mol or larger.

The separation layer may be formed in the conventional method such as dip coating, spray coating and spin coating, and the method is not limited to a specified one. Since the separation layer is required to cover all larger pores opening on the surface of the porous ceramic body than the pores of the separation layer, the layer is required, at least, to be formed on the exposed surface of the porous ceramic body, and preferable to be also formed on the densified portion filled with the ceramic filler, and more preferable to be also formed on the bonded portion to the filter component.

Preferably, the burning temperature for forming the separation layer is, for instance, about 600-1100° C., and is suitably determined for such as the component material of the separation layer and conditions for use of the ceramic filter assembly, and is not limited to a specified temperature. The burning temperature upon forming the separation layer is preferably set at the lower temperature than those in the previous treatments, more preferably set at the lower temperature by about not smaller than 100° C. (that is, by about 100° C. lower or further lower) when the heating treatments for filling of the ceramic filler (that is, the densifying treatment) and for bonding to the filter component have been performed. It is preferable to form the separation layer in the non-oxidization mood for the burning mood including such as hydrogen-nitrogen mixed gas and ammonia gas. Any porous ceramic body having any shape such as a cylindrical or planar shape may be employed according to any of the first to third aspects of the present invention, and it is not limited to one having a specified shape.

DETAILED DESCRIPTION OF EXEMPLARY EMBODIMENTS

Hereinafter, there will be described the present invention by reference to the drawings. The figures are appropriately simplified or transformed, and all the proportion of the dimension and the shape of a portion or member may not be reflective of the real one in the following embodiments.

Figure 1:
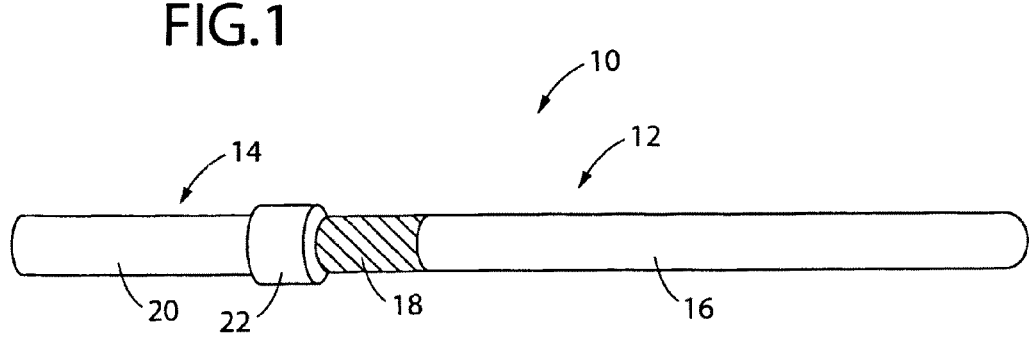
FIG. 1 illustrates a ceramic filter assembly in whole of an embodiment according to the present invention in a perspective view.

FIG. 1 illustrates a ceramic filter assembly 10 in whole of an embodiment according to the present invention in a perspective view. The assembly 10 has a tubular shape in whole having a bottom, and includes a filter 12 having an opening on the left side and a bottom to be closed on the right side in FIG. 1, and a tubular connector 14 connected to the left side and on the opening of the filter 12.

The whole filter 12 is constituted by ceramic, and includes a porous material portion 16 on the bottom side, and a dense material portion 18 on the connector 14 side of the filter 12. The area filled with oblique lines in FIG. 1 indicates the dense material portion 18. The connector 14 is constituted of such as Kovar® alloy, and includes a support portion 20 having the predetermined internal and external diameters and a connection portion 22 halving the predetermined internal and external diameter each of which is somewhat larger, respectively, than that of the support portion 20. The dense material portion 18 of the filter 12 is inserted into the inside of connection portion 22 to be connected.

Figure 2:
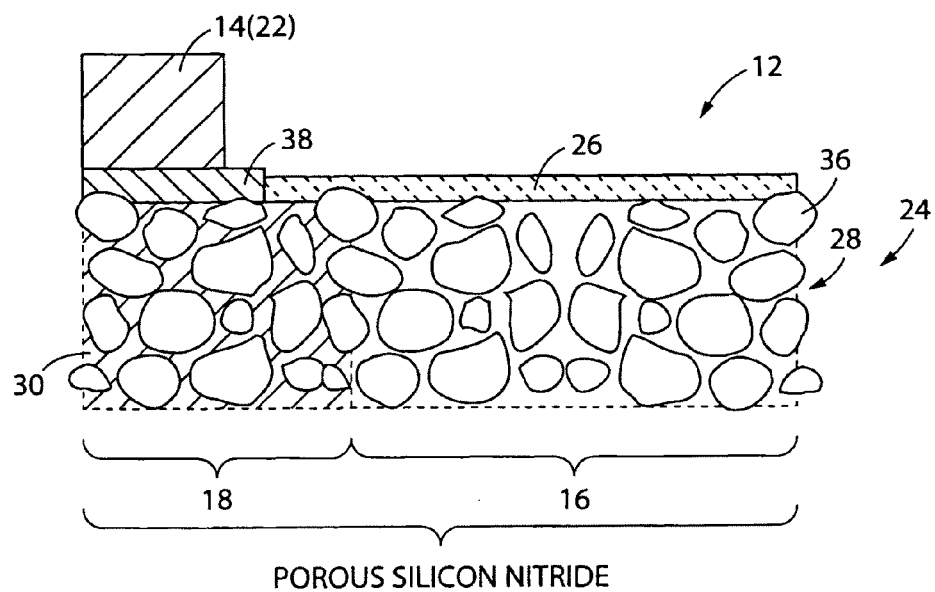
FIG. 2 diagrammatically illustrates the ceramic filter assembly in FIG. 1 around the connection of the composite ceramic body and the connector in an enlarged sectional view.

FIG. 2 diagrammatically illustrates the filter assembly 10 around the connection of the filter 12 and the connector 14 in an enlarged sectional view. The filter 12 includes a composite ceramic body 24 and a separation layer 26, and the external surface of the composite ceramic body 24 is covered with the separation layer 26. The separation layer 26 is constituted such as of porous silicon nitride having remarkably fine or micro pores. However, the pores are not shown in FIG. 2. The composite ceramic body 24 is constituted of a tubular porous ceramic body 28 having the bottom and the substantially same shape as the whole shape of the filter 12, and a ceramic filler 30 filled in one end on the opening side in the longitudinal direction. The one end of the porous ceramic body 28 filled with the ceramic filler 30 becomes densified by occlusion of the pores. Thus the dense material portion 18 is formed and the remainder of the body 28 corresponds to the porous material portion 16.

Figure 3:
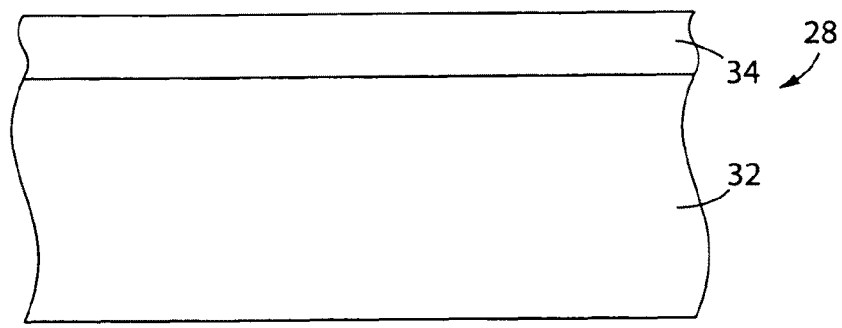
FIG. 3 diagrammatically illustrates a structure of the porous ceramic body of the ceramic filter assembly in FIG. 1 in a sectional view.

The porous ceramic body 28 and the ceramic filler 30 are both made of silicon nitride. The whole of the porous ceramic body 28 may be formed to have a uniform structure as diagrammatically shown in FIG. 2. Preferably, for instance, the body 28 may include a porous base 32 and porous intermediate layer 34 and the surface of the base 32 is covered with the layer 34 as diagrammatically shown in FIG. 3. (Pores of the base 32 and the layer 34 are not shown in FIG. 3.) In this embodiment, for instance, pores of the base 32 have about 1.0 μm in diameter and the porosity of the base 32 is about 35%, and pores of the intermediate layer 34 have about 0.1 μm in diameter and the porosity of the layer 34 is about 50%. The porous ceramic body 28 may preferably have a structure of the base 32 having comparatively large pores and the intermediate layer 34 having smaller pores and larger porosity than those in the base 32, disposed on the base 32.

The porous ceramic body 28 includes a plurality of silicon nitride grains 36, and a brazing metal layer 38 connects the filter 12 with the connector 14. The brazing metal layer 38 is, for instance, made of Ag—Cu—Ti series brazing metal. The connector 14 is connected to the filter 12 on the dense material portion 18 that is a densified portion of the composite ceramic body 24 filled with the ceramic filler 30 as shown in the FIG. 2 in the sectional view. The brazing metal layer 38 is formed only on the dense material portion 18. And there is a part of the dense material portion 18 that is not covered with the brazing metal layer 38 on the closed (bottom) side of the filter 12. The brazing metal layer 38 extends beyond the end surface of the connector 14 (toward the closed side of the filter 12), and there is no space between the connector 14 and the dense material portion 18 of the filter 12. A part of the dense material portion 18 is covered with the separation layer 26 on the opening side of the filter 12 and, that is, the porous material portion 16 is thoroughly covered with the separation layer 26.

Figure 4:
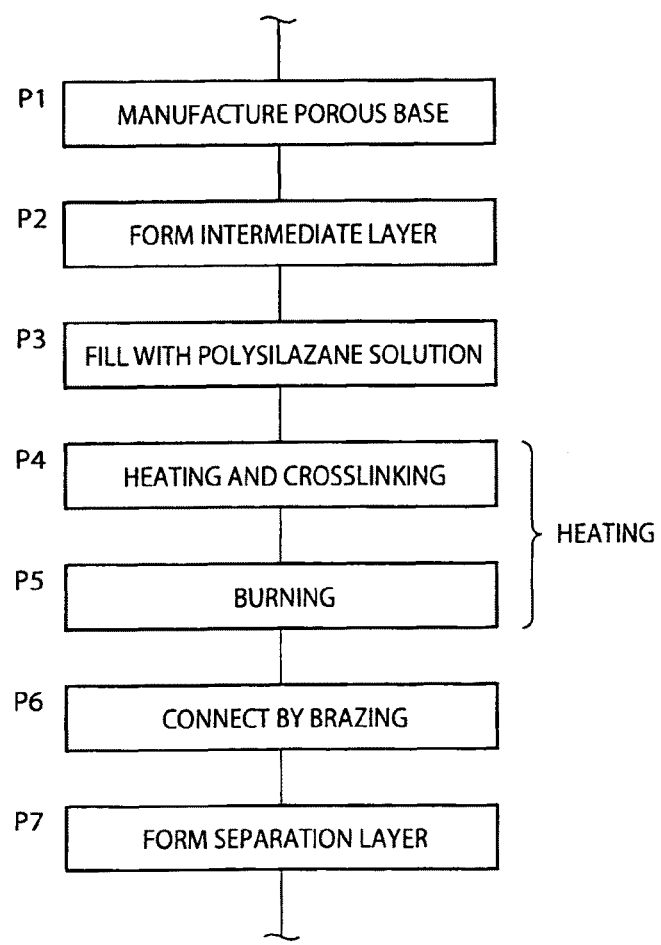
FIG. 4 illustrates substantial steps for manufacturing the ceramic filter assembly in FIG. 1.

The filter assembly 10 constituted as described above is, for instance, manufactured in the steps in FIG. 4. In step P1 for manufacturing the porous base, the base 32 is manufactured by the conventional appropriate method to manufacture porous silicon nitride ceramic material. The base 32 can be obtained, for instance, by addition of organic or inorganic material functioning as a pore forming agent to silicon nitride material, in an appropriate method such as wet isostatic pressing molding (Cold Isostatic Pressing or CIP) or extrusion molding to make a formed object, and in appropriate treatments of such as degreasing, burning and polishing. The silicon nitride material of, for instance, about 5-10 μm in the average diameter of grains may be employed in step P1 for the porous ceramic body 28 including the intermediate layer 34.

In step P2 for forming the intermediate layer 34, the layer 34 is formed by dipping the base 32 in the prepared silicon nitride layer forming solution to be coated with the solution in an appropriate method such as a dip coating method, and drying and burning treatments. Thus, step P2 provides the porous ceramic body 28. Step P2 is omitted for the porous ceramic body 28 without the intermediate layer 34 because step P1 can by itself provide the desired porous ceramic body 28. The silicon nitride layer forming solution is prepared by dispersing finer silicon nitride material such as about 0.1-5 μm in average diameter of grains than those employed for preparing the base 32, in an appropriate solvent medium such as water or organic solvent.

Figure 5:
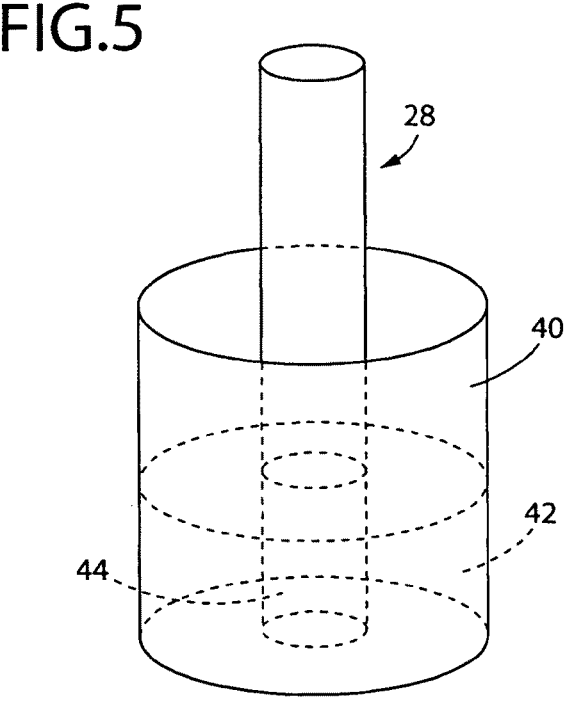
FIG. 5 illustrates an example of the embodiment of the step for burning in FIG. 4.

In step P3 for filling polysilazane solution, one end 44 of the porous ceramic body 28 is dipped in a polysilazane solution 42 in an alumina crucible 40, the crucible 40 with the ceramic body 28 is carried into the furnace chamber of a burning furnace (not shown), and the furnace chamber of air is exhausted or evacuated to have, for instance, about 100 Pa of air pressure as diagrammatically shown in FIG. 5. Thus, the polysilazane solution 42 is impregnated into the pores in the porous ceramic body 28. This step corresponds to the impregnation step in this embodiment. The polysilazane solution 42 is prepared by dissolving polysilazane of, for instance, about 1300 g/mol in its number-average molecular weight having a repetition structure of fundamental units of at least one of [—Si(H)($C_nH_{2n+1}$)—NH—] and [—Si($C_nH_{2n+1}$)$_2$—NH—], for instance, [—Si(H)(CH$_3$)—NH—] and [—Si(CH$_3$)$_2$—NH—] of such as NCP-100 or NCP-200 provided by Chisso Corporation, in organic solvent such as toluene or xylene, and regulating its viscosity to be about 20 mPa·s. For instance, the alumina crucible 40 of such as SSA-S made of high-purity alumina provided by Nikkato Corporation may be employed.

In step P4 for heating and crosslinking, after replacement of the mood in the furnace chamber containing the alumina crucible 40 by nitrogen, heating (or the first heating) is performed. This heating results in the development of crosslinking reaction of polysilazane, for instance, by heating up to 250° C. at a rate of 1° C./min and maintaining it at that temperature for about three hours.

In step P5 for burning, next heating (or the second heating) is performed following the above step P4 for heating and crosslinking. In this step, after heating up to 1100° C. at a rate of 1° C./min and maintaining it at that temperature for about an hour, and cooling it to the room temperature, the burnt product (base or ceramic body) is taken out. Thus, silicon nitride is generated from polysilazane, that is, polysilazane is converted to silicon nitride, and this provides the composite ceramic body 24 constituted of the porous material portion 16 and the dense material portion 18 formed by filling with the ceramic filler 30 in the pores of the porous ceramic body 28. The dense material portion 18 is formed in the area ranging, for instance, about 10 mm in the longitudinal direction from the opening at the open end. That is, in step P3 for filling polysilazane solution, a part of the porous ceramic body 28 of about 10 mm in the longitudinal direction from one end is impregnated in the polysilazane solution 42. In the present embodiment, step P4 for heating and crosslinking and step P5 for burning correspond to the heating steps.

In step P6 for connecting (or bonding) by brazing, brazing material such as Ag—Cu—Ti series alloy brazing material is applied on the inner circumferential surface of the connection portion 22 of the connector 14 or on the outer circumferential surface of the dense material portion 18 of the composite ceramic body 24, the dense material portion 18 is inserted into the connection portion 22, and then the product is heated, for instance, at about 900° C. in a vacuum. This melts the brazing material and then it is hardened during cooling period in the heating treatment to provide the composite ceramic body 24 to which the connector 14 is tightly bonded by grace of the brazing metal layer 38.

In step P7 for forming the separation layer, the composite ceramic body 24 having the connector 14 connected is immersed in another polysilazane solution (or a secondary polysilazane solution) than the polysilazane solution 42, for instance, on the closed end side, in order to have the body 24 coated with the another polysilazane solution by such as dip coating to the adjacency of the boundary with the connector 14. This another polysilazane solution is prepared by dissolving polysilazane of about 4800 g/mol in its number-average molecular weight having a repetition structure of fundamental units of at least one of [—Si(H)($C_nH_{2n+1}$)—NH—], [—Si($C_nH_{2n+1}$)$_2$—NH—] and [—SiH$_2$—NH—], for instance, [—Si(H)(CH$_3$)—NH—], [—Si(CH$_3$)$_2$—NH—] and [—SiH$_2$—NH—], in organic solvent such as toluene or xylene, and regulating its viscosity to be about 105 mPa·s. The composite ceramic body 24 is immersed in the another polysilazane solution, for instance, for about 30 seconds. And then a dense material layer of silicon nitride, that is, the separation layer 26 is formed by conversion of the another polysilazane solution coating applied on the body 28 by a burning treatment, for instance, at 650° C. in an ammonia mood.

Figure 6:
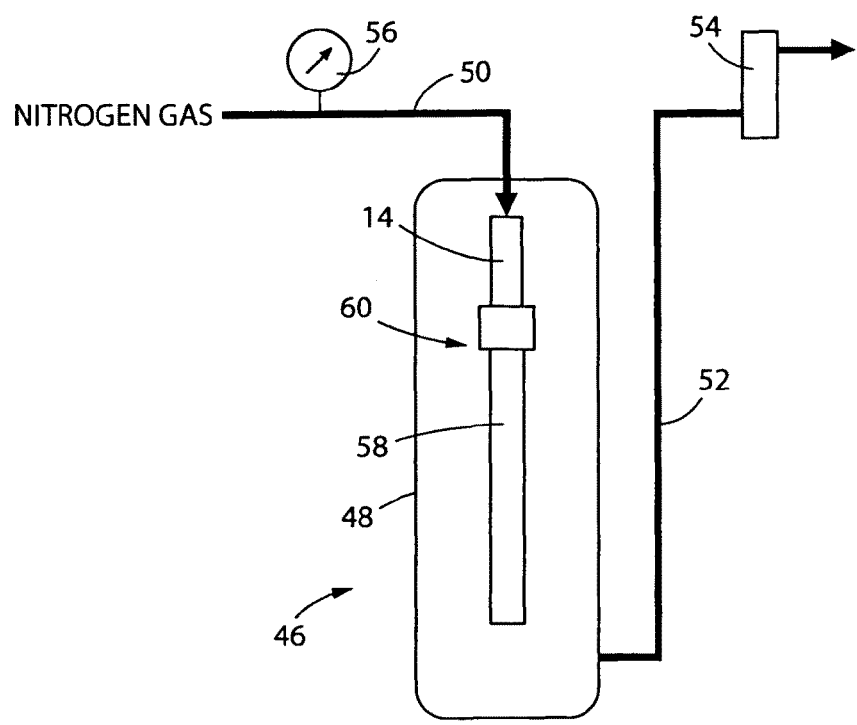
FIG. 6 illustrates a system of a leakage test apparatus.

FIG. 6 illustrates a system of a leakage test apparatus 46 for testing sealing capability of the dense material portion 18 formed in steps P3 for filling polysilazane solution to P5 for burning in the method of manufacturing the filter assembly 10. The leakage test apparatus 46 includes a closed vessel 48, a gas supply passage 50 to supply nitrogen gas into the closed vessel 48, a gas exhaust passage 52 to exhaust the gas from the closed vessel 48, and a gas flowmeter 54 provided on the gas exhaust passage 52. There is a pressure gauge 56 shown in FIG. 6. Instead of the filter assembly 10 a sample 60 constituted of a leakage test sample 58 densified in whole and prepared by impregnating the polysilazane solution into the porous ceramic body 28 in whole and the connector 14 connected to the leakage test sample 58 in the same manner as in the filter assembly 10 was employed. The sample 60 has no separation layer 26 formed.

The sample 60 is fixed in the closed vessel 48 and the connector 14 is air-tightly connected to the gas supply passage 50. Then, nitrogen gas is supplied through the gas supply passage 50 into the filter assembly 10 with applying a pressure of about 0.5 MPa, while the side of the gas exhaust passage 52 is maintained at about 0.1 MPa, that is, equal to the atmospheric pressure. The flow rate of the nitrogen gas exhausted from the gas exhaust passage 52 is measured by the gas flowmeter 54. In this test the amount of leakage from the densified portion densified with polysilazane can be measured because there is no leakage from the connector 14 and brazing metal layer 38. The amount of leakage from the sample 60 was about 0.07 ml/min.

Figure 7:
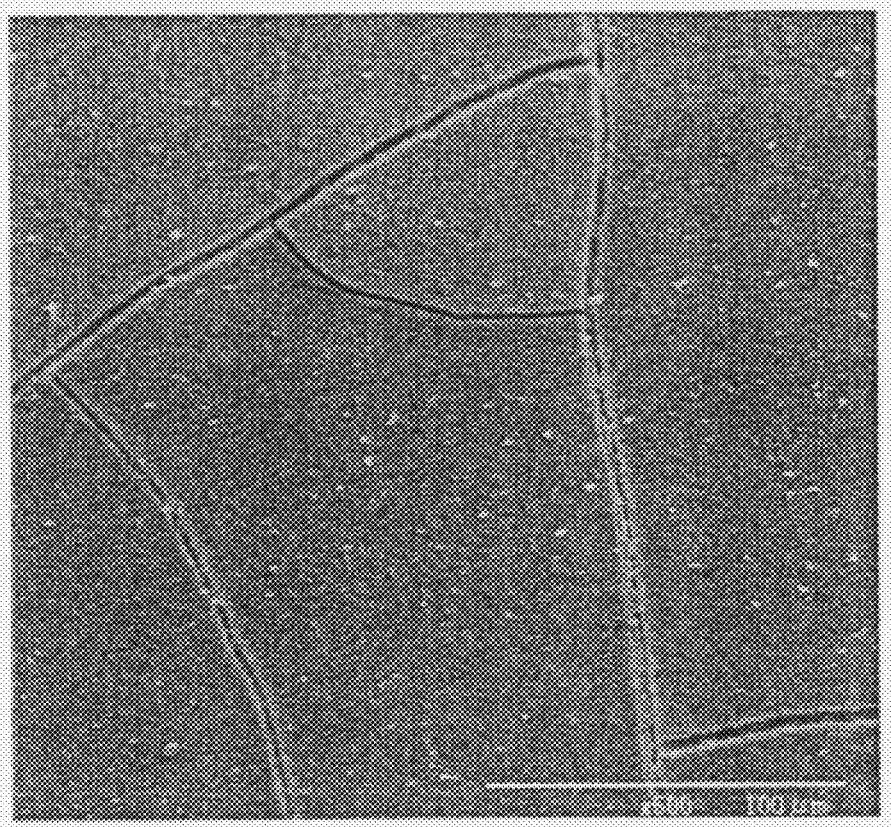
FIG. 7 illustrates a surface of a comparative sample after burning using another polysilazane than in the embodiment, prepared on the basis of a microphotograph.

The amount of leakage from another sample for a comparative test prepared by using another kind of polysilazane for densifying of the porous ceramic body was measured in the same manner as the above test. Another sample was prepared in the same manner as one for the sample 60 other than using a polysilazane solution prepared by dissolving polysilazane of about 700 g/mol in its number-average molecular weight having a repetition structure of fundamental units of [—SiH$_2$—NH—] of such as NN110 provided by AZ Electronic Materials K.K., in toluene, and regulating its viscosity to be about 10 mPa·s. The test confirmed inferior sealing capability of the remarkable large amount of leakage of 720 ml/min. FIG. 7 illustrates a surface of the sample after burning prepared on the basis of a microphotograph. As shown in FIG. 7, a plurality of cracks are generated on the surface of the porous ceramic body after impregnation of polysilazane and burning, and it is inferred that these cause the remarkable large amount of leakage.

Figure 8:
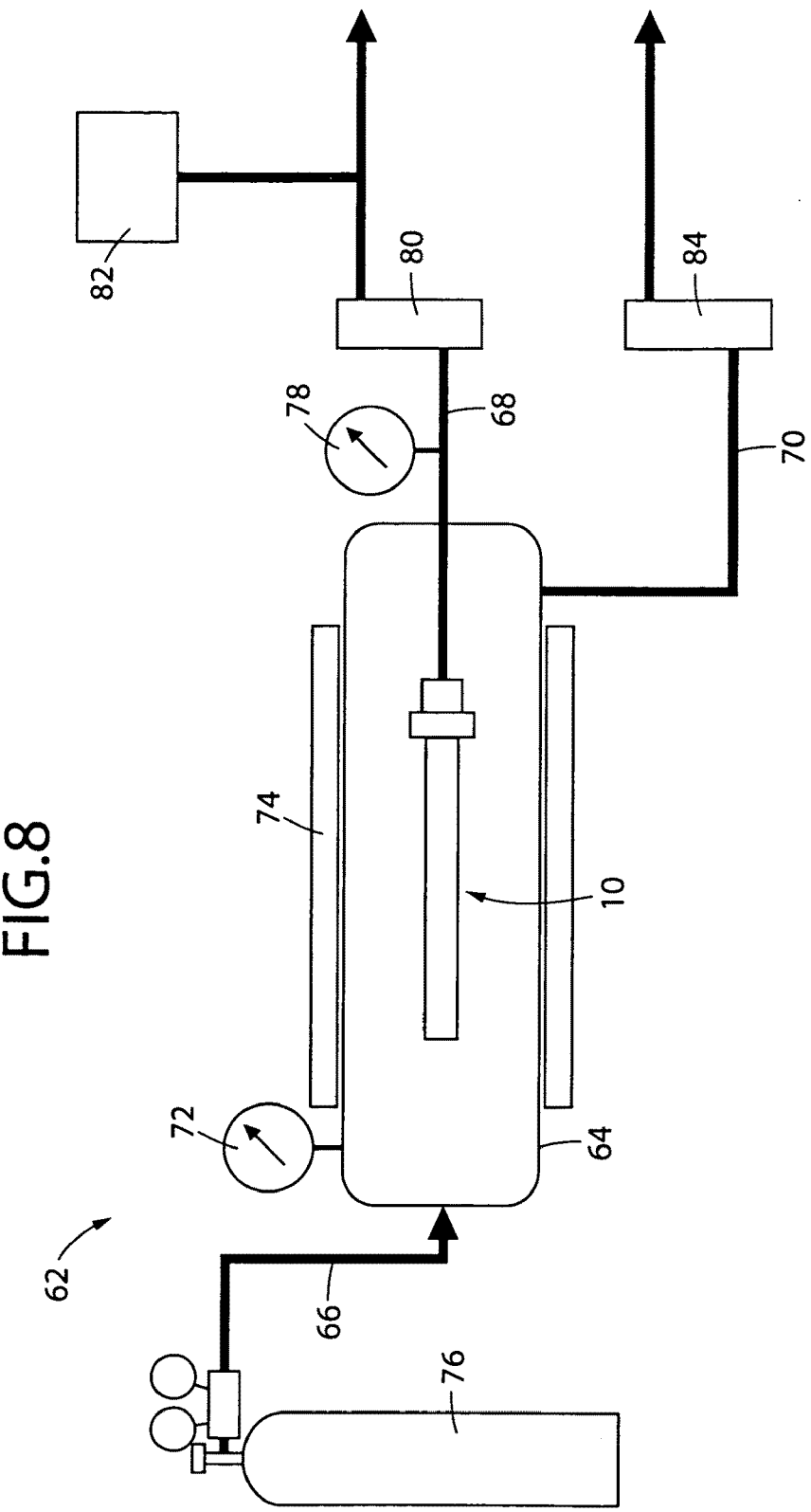
FIG. 8 illustrates a system of a gas separation apparatus using the ceramic filter assembly in FIG. 1.

FIG. 8 illustrates a system of gas separation apparatus 62 using the filter assembly 10. In FIG. 8 the gas separation apparatus 62 includes a pressure vessel 64 made of stainless steel (SUS in the Japan Industrial Standards), a gas supply passage 66 to supply gas into the pressure vessel 64, a gas recovery passage 68 to recover the separated gas permeating through the filter assembly 10, and an exhaust passage 70 to exhaust the remainder of the gas other than ones that cannot permeate. The pressure vessel 64 has a pressure gauge 72 to display the amount of the pressure inside the vessel 64, a heater 74 disposed on the outer circumferential surface of the vessel 64 to heat the inside, and a structure for holding the filter assembly 10 inside itself. A gas container 76 storing such as a mixed gas of hydrogen (H$_2$) and nitrogen (N$_2$) in a rate of 1:1, that is, 50% and 50% is connected to the gas supply passage 66. A pressure gauge 78, a flowmeter 80 and a gas chromatography device 82 are connected to the gas recovery passage 68. The exhaust passage 70 has a flow rate controller 84.

The filter assembly 10 is held in the pressure vessel 64, and the inside of the vessel 64 is heated by the heater 74 at such as 200-600° C. in the system of the gas separation apparatus 62. Then after the cock of the gas container 76 is turned on, the mixed gas of hydrogen (H$_2$) and nitrogen (N$_2$) is supplied through the gas supply passage 66 into the pressure vessel 64, and at the same time the pressure in the pressure vessel 64 is regulated at 0.5 MPa, the pressure of the gas recovery passage 68 is regulated at 0.1 MPa, that is, equal to the atmospheric pressure, and the flow rate from the exhaust passage 70 is regulated at 3 liter/min after the valves of the gas recovery passage 68 and the exhaust passage 70 are opened. This provides separation of only hydrogen in the mixed gas supplied from the gas supply passage 66 by permeation of hydrogen through the separation layer 26 and the travel into the inner circumferential side of the filter assembly 10 to be recovered through the gas recovery passage 68. The remainder of gas that did not permeate the separation layer 26 is exhausted through the exhaust passage 70.

Figure 9:
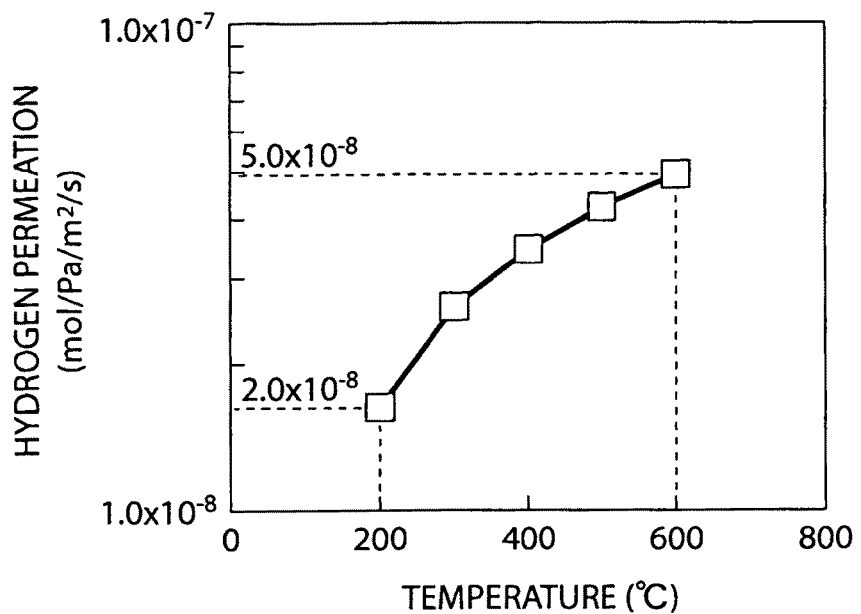
FIG. 9 is a graph showing the results of measurements of hydrogen permeation in the gas separation apparatus in FIG. 8.
Figure 10:
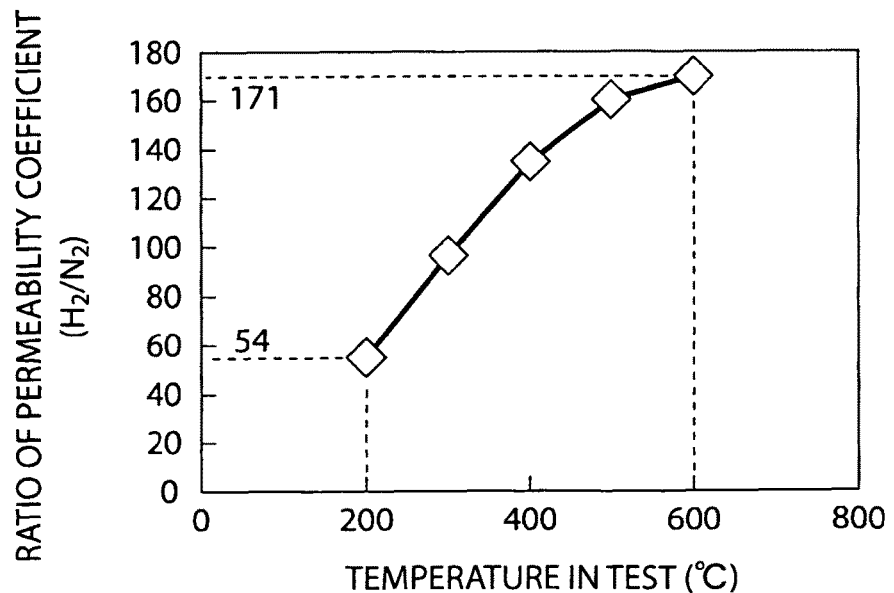
FIG. 10 is a graph showing the results of measurements of the ratio of permeability coefficient in the gas separation apparatus in FIG. 8.

FIGS. 9 and 10 illustrate the results of measurements of hydrogen permeation and the ratio of permeability coefficient (H$_2$/N$_2$) in the range of 200-600° C. as mentioned above. This provides not only sufficient separation capability even at 200° C. usable from before but also gas separation capability at 300-600° C. with the large amount of hydrogen permeation and the high ratio of permeability coefficient without leakage to separate the gas by using the filter assembly 10 according to the present embodiment.

In step P3 for filling polysilazane solution, the polysilazane solution 42 having a repetition structure of fundamental units of at least one of [—Si(H)(CH$_3$)—NH—] and [—Si(CH$_3$)$_2$—NH—] is impregnated into the pores in the porous ceramic body 28, in step P4 for heating and crosslinking and in step P5 for burning, the polysilazane in the pore is converted to silicon nitride ceramic. Then crosslinking and polymerization reactions upon drying and burning are restrained in the polysilazane, and it causes to restrain volume shrinkage and, accordingly, to prevent generation of cracks. Furthermore, the advantage of restraining crosslinking and polymerization reactions permits to use polysilazane of high molecular weight such as about 1300 g/mol as described above and, accordingly, to restrain generation of voids caused by volatilization of the solvent upon drying and burning and furthermore to restrain increasing in porosity. Thus, the composite ceramic body 24 can be obtained by filling the pores of the porous ceramic body 28 with the ceramic filler 30 made of silicon nitride converted from polysilazane and densifying, with restraining generation of cracks.

Since the pores in the porous ceramic body 28 of the composite ceramic body 24 is filled with the ceramic filler 30 made of silicon nitride generated from polysilazane having a repetition structure of fundamental units of at least one of [—Si(H)(CH$_3$)—NH—] and [—Si(CH$_3$)$_2$—NH—], the dense composite ceramic body 24 having substantially no cracks can be obtained according to the present embodiment.

Since the connector 14 made of dense material is tightly connected to the densified portion, that is, the dense material portion 18, of the composite ceramic body 24 by the ceramic filler 30, the connected portion is sufficiently sealed and, accordingly, the filter assembly 10 having high sealing capability in the connected portion of the porous ceramic body 28 and the connector 14 can be obtained according to the present embodiment.

Figure 11:
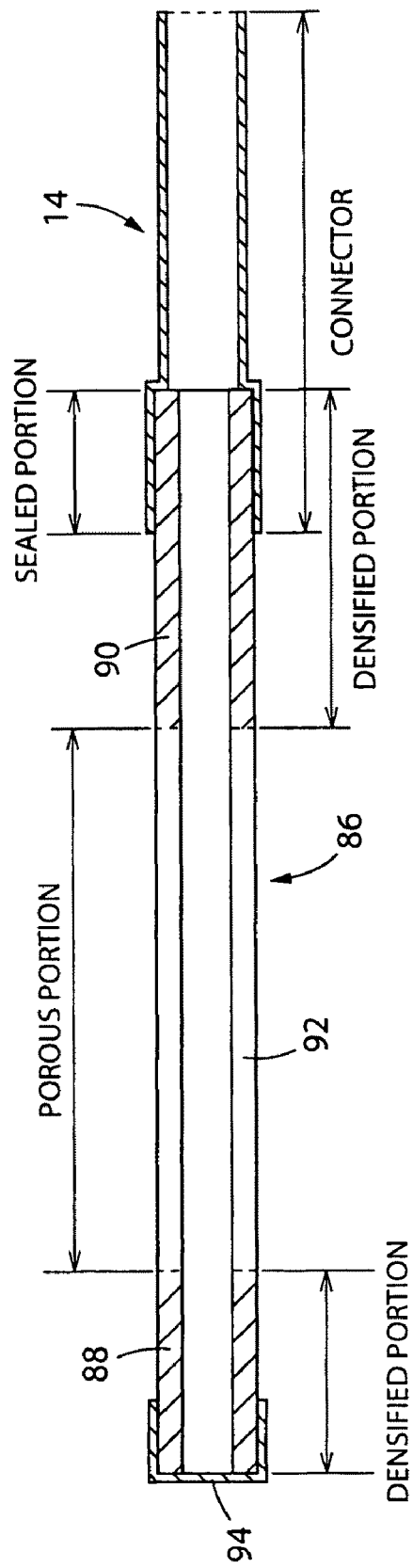
FIG. 11 illustrates a composite ceramic body according to another embodiment of the present invention connected to the connector in the sectional view.

FIG. 11 illustrates a composite ceramic body 86 according to another embodiment of the present invention connected to the connector 14 in the sectional view. The composite ceramic body 86 is manufactured in the same manner as one for the composite ceramic body 24 by impregnation of the polysilazane solution into the porous ceramic body made of silicon nitride and converting the polysilazane solution in the pores into silicon nitride to be the ceramic filler. However, the body 86 is different from the body 24 in shape and the body 86 has openings at its ends of the tubular porous ceramic body. Thus, the composite ceramic body 86 has dense material portions 88, 90 formed at both ends and a porous portion 92 disposed between them and filled with no fillers in its pores.

The similar connector 14 to one for the composite ceramic body 24 is connected to the composite ceramic body 86 at the right end in FIG. 11, and the porous ceramic body of the composite ceramic body 86 is capped with a cap 94 made of dense metal as well as the connector 14 such as Kovar® alloy at the left end in FIG. 11, on a part of an end side of a dense material portion 90, and the part is fitted into the cap 94 and connected and bonded by such as brazing material to close the left end. The composite ceramic body 86 having a structure as described above is utilized as a component for such as a filter assembly because it has the same structure of a tube having a bottom by capping with the cap 94 on an opening of the porous ceramic body to be closed, as the composite ceramic body 24. Also in this embodiment the dense material portion 88 is densified without generation of cracks and it causes superior sealing at the opening of the end with the cap 94 connected.

Figure 12:
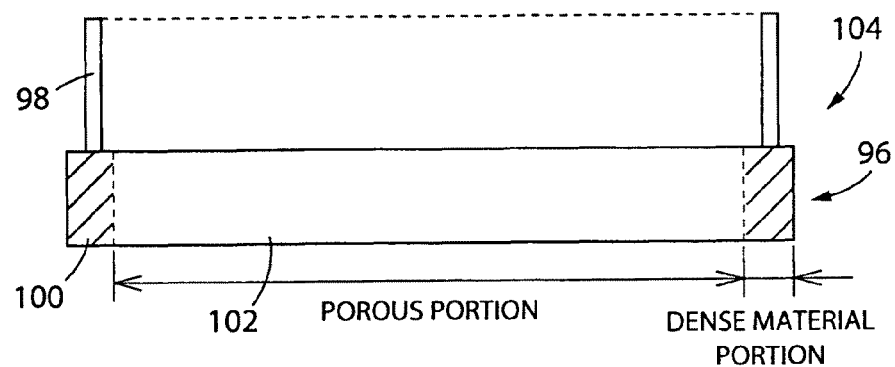
FIG. 12 illustrates a composite ceramic body according to another embodiment of the present invention connected to the connector in the sectional view.

FIG. 12 illustrates an assembly 104 according to another embodiment of the present invention including a composite ceramic body 96 connected to a connector 98 in the sectional view. The composite ceramic body 96 is constituted, for instance, of a thin disk of porous ceramic, and includes a dense material portion 100 disposed in the radially outer portion of the thin disk and filled with a ceramic filler converted from polysilazane in the same manner as one for the composite ceramic body 24, and a porous material portion 102 in the radially inner portion of the disk. A tubular connector 98 is axially short in length and disposed on the upper surface of the dense material portion 100 of the composite ceramic body 96 at the lower end of the connector 98 and connected or bonded by such as brazing material in FIG. 12.

Also in this embodiment a part of, that is, the radially outer portion of the porous ceramic disk is densified by filling the ceramic filler, and the connector 98 of dense material is bonded to the composite ceramic body 96 on the upper surface of the dense material portion 100. The dense material portion 100 is densified without generation of cracks as well as in the composite ceramic bodies 24, 86.

The upper surface of the porous material portion 102 of the assembly 104 including the composite ceramic body 96 and the connector 98 faces on only the inside of the connector 98, that is, any upper surface of the portion 102 does not face on the outside of the connector 98. The assembly 104, for instance, can be utilized for a separation apparatus recovering only the permeated and separated gas through the connector 98 in which the connector 98 is connected to an airtight vessel and fixed at its radially outer surface and the mixed gas is supplied through the lower surface of the composite ceramic body 96.

Figure 13:
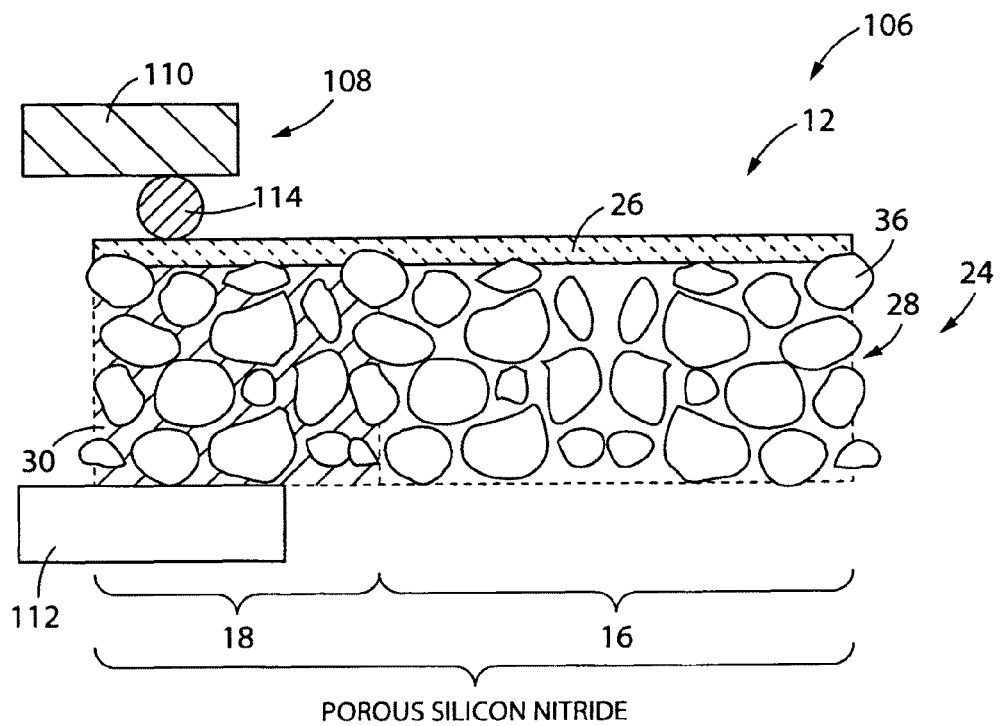
FIG. 13 illustrates a connection portion of a ceramic filter assembly showing a sealing structure using a metal ring according to another embodiment of the present invention in the sectional view.

FIG. 13 illustrates a connection portion of a filter assembly 106 according to another embodiment of the present invention in the sectional view. The filter assembly 106 has the same composite ceramic body as the composite ceramic body 24 in the assembly 10. The common portions have the same reference numerals as in the assembly 10 and explanations are not provided. A connector 108 has a radially outer portion 110 disposed on the outer side and a radially inner portion 112 disposed on the inner side of the composite ceramic body 24. The radially inner portion 112 is forced to the radially inner surface of the composite ceramic body 24, and at the same time the radially outer portion 110 is forced to the radially outer surface of the composite ceramic body 24 through an O-ring 114 made of metal. Filter components can be, thus, connected to the composite ceramic body through a metal ring.

It is to be understood that the present invention may be embodied with other changes, improvements, and modifications that may occur to a person skilled in the art without departing from the scope and spirit of the invention defined in the appended claims.

What is claimed is:

1. A method for manufacturing a composite ceramic body with occluding a plurality of pores that are open at its surface of a porous ceramic body, the method comprising the steps of:
   impregnating a polysilazane solution including polysilazane having a repetition structure of fundamental units of at least one of [—Si(H)($C_nH_{2n+1}$)—NH—] and [—Si($C_nH_{2n+1}$)$_2$—NH—], and a predetermined organic solvent, into the plurality of pores of the porous ceramic body by immersing the ceramic body in the polysilazane solution, and
   heating the porous ceramic body while the porous ceramic body is immersed in the polysilazane solution to convert the polysilazane in the plurality of pores into ceramic material.

2. A composite ceramic body manufactured by a method for manufacturing a composite ceramic body according to claim 1, wherein the composite ceramic body includes
   a ceramic filler generated from polysilazane having a repetition structure of fundamental units of at least one of [—Si(H)($C_nH_{2n+1}$)—NH—] and [—Si($C_nH_{2n+1}$)$_2$—NH—], the ceramic filler is filled into the plurality of pores to occlude them.

3. The composite ceramic body of claim 2, wherein the polysilazane has about 500-5000 g/mol in its number-average molecular weight.

4. The composite ceramic body of claim 2, wherein pores included in the plurality of pores in a predetermined area on the surface of the porous ceramic body, are occluded by the ceramic filler.

5. A ceramic filter assembly comprising:
   the composite ceramic body of claim 4, and
   a filter component made of dense material tightly connected to a surface in a predetermined area of the composite ceramic body.

6. The ceramic filter assembly of claim 5, wherein the plurality of pores of the porous ceramic body are coated with a separation layer having a plurality of micro pores of which a diameter is smaller than that of the plurality of pores of the porous ceramic body.

7. The ceramic filter assembly of claim 6, wherein the porous ceramic body is made of silicon nitride ceramic, and the separation layer is made of another polysilazane having a repetition structure of fundamental units of at least one of [—Si(H)($C_nH_{2n+1}$)—NH—], [—Si($C_nH_{2n+1}$)$_2$—NH—] and [—$SiH_2$—NH—].

8. The ceramic filter assembly according to claim 5, wherein the porous ceramic body has a tubular shape having a closed bottom, and the ceramic filler is filled into the plurality of pores in one end on an opening side of the tubular porous ceramic body in a longitudinal direction thereof to occlude the pores in the one end.

* * * * *